Patented June 6, 1939

2,161,085

UNITED STATES PATENT OFFICE 2,161,085

TREATMENT OF WELLS

William Clifton Phalen, Syracuse, N. Y., assignor to The Solvay Process Company, New York, N. Y., a corporation of New York No Drawing. Application December 22, 1937, Serial No. 181,104

7 Claims. (Cl. 166—21)

This invention relates to treating wells for the production of fluids, such as oil, gas, water, etc. More particularly, it relates to treating wells in which the producing horizon is located in fine-grained formations.

It has long been known that oil wells may be treated with acid in order to restore or increase their permeability and thereby their production. Apparently, the acid enlarges and cleans the drainage channels within the formation, as well as the bore hole, and as a result, the flow of oil or gas is augmented. For instance, if calcareous formations, such as limestones, dolomites, calcareous oil sands, etc., are treated, the acid penetrates the formation, dissolves calcium and/or magnesium carbonate constituting the walls of the drainage channels through the formation, and enlarges these channels.

Further, it has been proposed to treat wells with an acid followed immediately by a limited quantity of alkali to neutralize the acid wetting the metal tubing of the well, in order to avoid corrosion thereof, or to treat wells with alternate volumes of acid and alkali so that the acid and alkali react within the well to generate heat, which is said to aid in opening the oil passageways.

However, notwithstanding the rapid strides which have been made in the development of oil well treatment during the past few years, it is still well recognized that the desired degree of improvement in permeability is not always accomplished. While ordinary acid treatment may give satisfactory results when applied to wells located in one type of formation, it may be a commercial failure when applied to wells located in another type of formation. In fact, it has been shown that an actual decrease in permeability may occur when fine-grained calcareous formations are subjected to the same acid treatment successful in larger-grained formations. This decrease in permeability in fine-grained formations appears to be due to clogging of the small drainage channels by acid-insoluble residues. These insoluble residues resulting from the acid treatment have been shown to be needle-like crystals of silicates mixed with a little colloidal silica and colloidal organic matter.

As might be expected, the clogging effect of the acid-insoluble silicates and colloidal matter depends upon the size of the drainage channels; i. e., the finer the drainage channels the greater the clogging effect and hence the greater the decrease in permeability. Thus, in formations where the drainage channels are very large and the fluids drain chiefly through the larger channels, such as in certain fields of north-central Texas and southeastern New Mexico, the acid may flow freely into the channels and further enlarge them, and any residue resulting from the acid treatment may be washed out through the large channels. However, in fine-grained formations such as comprise the structure of many oil fields; for instance, the Upper and Lower Cretaceous limestone of Travis County, Texas, and the Strawn sandstone in Palo Pinto County, Texas, the acid may flow only slowly through the formation, and the silicious residue resulting from the acid treatment may consist of granules and crystals larger than the fine drainage channels of the formation. As a result, some of the channels may become firmly clogged and permeability may be decreased regardless of the amount of washing out that is attempted.

It is an object of this invention to restore or increase the production of wells located in fine-grained calcareous formations.

It is a further object of this invention to supplement acid treatment of wells located in fine-grained, calcareous formations with a chemical treatment which removes the insoluble residue of the acid treatment from the drainage channels of the formation.

The process of my invention comprises treating wells located in fine-grained calcareous formations containing silicates first with acid, the acid being introduced into the well in the conventional manner, and then, after a sufficient time has elapsed for substantially all of the acid to react with the geological formation, with a solution of a hydroxide of an alkali-metal of sufficient strength and quantity to react with the acid-insoluble residues, which are formed by the acid treatment and which clog the channels in the fine-grained formation. The alkali-metal hydroxide serves to convert the residues to soluble compounds, whereby they are washed away and permeability is increased. Thus, contrary to prior treatments involving the use of both acid and alkali-metal hydroxides, the alkali-metal hydroxide of my process does not serve merely to neutralize the acid, but reacts with the acid-insoluble residues to form soluble compounds therefrom.

The strength of the alkali-metal hydroxide solution employed may vary over wide limits; a solution containing about 10% NaOH by weight may be used. Concentrations above 10% are preferred over lower concentrations. The volume of alkali-metal hydroxide solution employed depends upon the amount of acid-insoluble residue present in, and the size of, the area to be cleaned; in some cases a volume about one-half the volume of the acid used is sufficient. However, this value is in no way critical. It is to be understood that the principle involved is to dissolve the silicate residues resulting from the acid treatment and thus to increase the permeability of the formation; hence any quantity of alkali-metal hydroxide which performs this function is within the spirit of my invention. Where ample heating equipment is available, the alkali-metal hydroxide solution may be introduced into the well in a heated condition, say at a temperature around 100° C.

The particular acid chosen for use in my process will depend upon the nature of the formation. Any of the well known acid treatments may be used. It is preferred to use hydrochloric acid; however, other acids are suitable, as well as mixtures of acids; for instance, nitric acid or mixtures of hydrochloric and nitric acids form good treating agents for certain geological strata. The acid may contain a corrosion inhibitor.

The strength and quantity of acid used may vary widely; for instance, hydrochloric acid of from about 15% to about 36% HCl by weight may be used, and the quantity may vary from a few hundred to several thousands of gallons.

The time interval between introduction of acid and introduction of alkali must be sufficient to accomplish the solution of a substantial amount of acid-solubles. The extent of reaction may be determined roughly by measuring the loss of acid concentration of the treating solution. Preferably, the time should be sufficient to substantially exhaust the acid; e. g., to reduce its concentration to 1% or less. Normally, an acid treatment period of from 10 to 24 hours is sufficient to accomplish the desired results. Under some circumstances, it may be advantageous, prior to alkali treatment, to remove the acid from the well instead of permitting it to become exhausted. By adding concentrated fresh acid to the used acid, the solution may be placed in condition for reuse. Such a method of operation is not feasible, however, unless the acid employed is available in substantially higher concentration than is desired for the treating solution.

The invention will be further illustrated by the following example, but it is to be understood that the invention is not limited thereto.

1000 gallons of hydrochloric acid containing 15% HCl by weight are pumped into an oil well located in a fine-grained limestone formation containing calcium and magnesium carbonates and various impurities including silicates. After the acid reacts for twenty-four hours the residual acid concentration is less than 1%. At this time, 500 gallons of a 10% caustic soda solution are pumped into the well. The caustic soda reacts with the acid-insoluble silicate deposits which clog the drainage channels, to form a solution of soluble silicates. When the solution is removed from the formation, these silicates are washed out as are the calcium chloride, magnesium chloride, and other impurities. In this manner my process cleans the drainage channels and decidedly increases the permeability of the fine-grained formation.

A wetting or penetrating agent may be added to the acid and alkaline treating solutions, if desired. In the case of alkaline solutions, the addition of a fraction of 1%, say 0.005% to 0.10%, of isopropylnaphthalene sodium sulfonate has been found to produce an especially beneficial increase in the penetration, thus shortening the time and increasing the effectiveness of the treatment.

I claim:

1. A process adapted for increasing the production of wells in acid-treated, fine-grained, silicate-containing, calcareous formations, which comprises introducing into the formation sufficient alkali-metal hydroxide solution to react with and dissolve a substantial proportion of the residue left by the acid treatment.

2. A process for increasing the production of wells in acid-treated, fine-grained, silicate-containing, calcareous formations, which comprises introducing caustic soda into the formation after the acid has substantially all reacted.

3. A process for increasing the production of wells in acid-treated, fine-grained, silicate-containing, calcareous formations, which comprises introducing a caustic soda solution containing about 10% NaOH by weight into the formation after substantially all the acid has reacted.

4. A process adapted for increasing the production of wells in fine-grained, silicate-containing, calcareous formations, which comprises introducing hydrochloric acid into the formation and, after substantially all the acid has reacted, introducing caustic soda solution into the formation.

5. A process for increasing the production of wells in fine-grained, silicate-containing, calcareous formations, which comprises introducing aqueous hydrochloric acid solution containing between about 15% and about 36% HCl by weight into the formation and after substantially all the acid has reacted, introducing aqueous caustic soda solution into the formation.

6. A process for increasing the production of wells in fine-grained, silicate-containing, calcareous formations, which comprises introducing a hydrochloric acid solution into the formation to dissolve calcareous material and after the concentration of residual acid has been reduced at least to 1%, introducing into the formation sufficient aqueous caustic soda solution to react with and dissolve a substantial proportion of the insoluble residue resulting from the acid treatment.

7. A process for increasing the production of wells in fine-grained, silicate-containing, calcareous formations, which comprises introducing 1 part by volume of aqueous hydrochloric acid solution containing between about 15% and about 36% HCl by weight into the formation and after at least 10 hours' time has elapsed, introducing about ½ part by volume of aqueous caustic soda solution containing about 10% NaOH by weight into the formation to react with the acid-insoluble residue left by the acid treatment.

WILLIAM CLIFTON PHALEN.